United States Patent [19]

Meyer et al.

[11] Patent Number: 4,717,528

[45] Date of Patent: Jan. 5, 1988

[54] CONTROL ROD CONTROL SYSTEM

[75] Inventors: Charles E. Meyer, Monroeville; Bruce M. Cook, Pittsburgh; David H. Ditto, Monroeville; John W. Kaufmann, Murrysville, all of Pa.

[73] Assignee: Westinghouse Electric Corp., Pittsburgh, Pa.

[21] Appl. No.: 703,003

[22] Filed: Feb. 19, 1985

[51] Int. Cl.$^4$ ................................................. G21C 7/12
[52] U.S. Cl. ..................................... 376/237; 376/216
[58] Field of Search ............... 376/215, 216, 217, 228, 376/235, 236, 237, 258, 259

[56] References Cited

U.S. PATENT DOCUMENTS

| | | |
|---|---|---|
| 3,158,766 | 11/1964 | Frisch . |
| 3,385,758 | 5/1968 | Gyorey et al. ...................... 376/237 |
| 3,391,058 | 7/1968 | Gilbert ................................ 376/236 |
| 3,625,815 | 12/1971 | Fishman . |
| 3,654,608 | 4/1972 | Wavre ................................. 376/237 |
| 3,796,890 | 3/1974 | Thompson et al. ................ 376/237 |
| 3,843,471 | 10/1974 | Bevilacqua et al. . |
| 4,046,624 | 9/1977 | Aleite et al. ....................... 376/237 |
| 4,062,725 | 12/1977 | Bevilacqua et al. . |
| 4,075,059 | 2/1978 | Bruno et al. . |
| 4,085,004 | 4/1978 | Fletcher et al. . |
| 4,432,930 | 2/1984 | Impink, Jr. ........................ 376/236 |

OTHER PUBLICATIONS

Westinghouse Electric Corporation Document Number WCAP-7778 entitled "Solid State Rod Control System, Full Length" by A. Blanchard, et al.

Primary Examiner—David H. Brown
Assistant Examiner—Richard L. Klein

[57] ABSTRACT

A control system for a nuclear reactor is disclosed. A control rod strategy computer provides for dynamic control of core power distribution in both radial and axial directions and forms the basis for a partial trip capability. Several microprocessor-based computation centers are combined together in a data-sharing network which processors determine local power density, determine the instantaneous differential and integral reactivity worth of each group of control rods, determine and effectuate partial trip for immediate power reduction, determine and provide for uniform core burnup, and effectuate core reactivity changes by directing the movement of groups of four control rods from zero to one hundred percent of travel while minimizing power distribution factors throughout the core. The power control circuitry to move the groups of control rods are bus arranged such that the power circuitry is shared among the groups of control rods. In this manner, the power to the control rod drive mechanisms is controlled and bus arranged for distribution to these drive mechanisms. This arrangement allows separate housings or cabinets for each holding circuit for each group of control rods and one housing or cabinet for the moving circuit for all of the groups of control rods.

9 Claims, 7 Drawing Figures

CONTROL ROD CONTROL SYSTEM

BACKGROUND OF THE INVENTION

1. Field of the Invention

This invention relates in general to the field of nuclear reactor control systems and in particular to systems for controlling the operation of control rods which relate to reactor operation and control.

2. Description of the Prior Art

The general details of construction and operation of commercial pressurized water nuclear reactors are well known. Indeed, heat generated by such plants has successfully been converted to electrical power for not an insignificant number of years. Similarly, the manner and means to control the nuclear reaction and the power output from such nuclear reactors, namely: control rods, are also well known. A brief description of the construction and function of control rods is, however, beneficial for a full understanding of the invention.

Control rods each typically comprise a plurality of elongated rods which are parallel arranged around and attached to a central shaft. The control rods are insertable into a fuel assembly from outside the pressure vessel. Openings dispersed throughout the fuel assemblies allow for the insertion of the control rods. Each fuel assembly includes such openings for purposes of interchangeability even though a control rod is not used with each fuel assembly within the core. A control rod drive mechanism is used with each control rod to move the control rod into and out of the nuclear core. The drive mechanisms are each attached to the top of the pressure vessel. Electrical power is used to operate the control rod drive mechanisms.

Each of the elongated rods making up the control rod contain or comprise materials which absorb neutrons produced by the fission process of the nuclear reactor. Materials having a high neutron capture cross section are most often used for control rods. Accordingly, such materials as boron carbide, hafnium, or a combination of silver-indium-cadmium have been used successfully.

The prior art control rod drive system used in present day pressurized water nuclear reactors has not changed in any substantial manner since its initial application. The control rod drive mechanisms each consist of a stationary gripper and coil to hold the rod when it is not in motion. A movable gripper and coil holds the rod when the rod is being moved in stepped increments. A lift coil moves the movable gripper and rod a discrete distance or step. The three mechanisms are sequentially activated to produce a step up (the movable gripper is engaged before the lift coil is energized) or to produce a step down (the movable gripper is engaged after the lift coil is energized). The coils associated with four control rods (comprising a group) are jointly activated in the appropriate sequence by electrical apparatus housed within a single control cabinet so that the group of four control rods move up or down together. Each cabinet contains three controlled rectifier bridges, with one bridge controlling the current to the stationary gripper coils of four rods, another bridge controlling the movable gripper coils of the four rods, and the last bridge controlling the lift coils of the four rods. A second cabinet to control the coils of four other rods is used in conjunction with the first cabinet to move a second set of four rods in conjunction with the first set of four rods. The total of eight rods (two groups of rods) and eight separate drive mechanisms, comprise a "bank" of rods, with the rods being located symmetrically around the core to produce fairly uniform radial neutron flux perturbations. Each of the two groups of control rods comprising one bank are moved alternately to produce bank motion and to assure and maintain the previously noted symmetrical radial neutron flux perturbation. There are a number of banks of control rods in each nuclear reactor. Each bank of eight control rods has approximately the same reactivity worth. Sequential banks of control rods are maintained in a fixed separation or overlap which is kept uniform between all banks to produce a substantially uniform rate of reactivity insertion or removal.

Development of the control system for the control rod drive mechanism led to the use of one control cabinet for three groups of control rods. Within the cabinet, one bridge is used for the movable gripper coils and one bridge is used for the lift coils of all three groups of control rods. This is possible because at any one time only one group is moving while all other groups are stationary. On the other hand, separate bridges are required for the stationary gripper coils of each group of control rods. Thus, separate bridges are made available for the stationary gripper coils of each group of rods but the other bridges within the cabinet may be shared among the groups of rods by the use of appropriate switching circuitry. Accordingly, each control cabinet in the prior art contains five bridges plus power switching circuitry. Further attempts to include the control of the movement of additional groups of rods within a single cabinet were deemed futile because it required a cabinet of too large a physical size. It would be advantageous, obviously, to further extend the concept of sharing of electrical current control equipment to more than three groups of rods while maintaining the standard size control cabinet. Further, sharing of power control apparatus is, accordingly, an object of the present invention.

The design function of the control rod systems of the prior art, including the one described above, is to respond to mismatches or differences in the system temperature or turbine power from the reference values or demand values. In other words, to control the overall power output from the power plant. Although the insertion of the control rods in the nuclear core produces undesirable neutron flux perturbations, especially in the immediate vicinity of the control rods, which adversely affects the maximum operating power level of the nuclear reactor and, hence, the power plant, few achievements have been made whereby the operation of the control rods is used to shape the neutron flux throughout the nuclear core and to control the operating power level.

Flux perturbations are produced by other phenomena in addition to the control rods. The buildup of xenon, which is a nuclear poison, within the fuel elements during reactor operation also affects flux distribution. The abrupt ending of fuel elements at the radial periphery of the core also affects flux distribution. Similarly, the upper and lower axial limits of the fuel assemblies affects flux distribution. Proper flux distribution is very beneficial to reactor operation, power output, fuel life, fuel economy, reactor safety, and costs, just to mention a few.

In the past, part length control rods were utilized to damp any xenon-induced oscillation affecting the flux distribution. The subsequent determination that part length rods could potentially adversely affect the shape of the flux led to their prohibition altogether. This then left the entire task of flux shaping and power level control to the full length control rods. Later, the concept of a "light" bank of control rods to primarily control the power output, while the other banks remained at normal worths, was introduced. This concept represented a significant improvement in reactor capabilities without requiring any significant change in the control rod system. Shortly afterward, the "light" bank concept was extended further to "ultra-light" banks and "gray" banks control concepts. These, however, were rejected for actual use because their use would have required major changes in the control rod assemblies and/or the rod control system design.

Accordingly, new and improved methods of reactor power control in conjunction with neutron flux shaping are required and are objects of the present invention.

Another object of the present invention is to provide such power control and flux shaping without requiring major design and hardware changes to the presently known nuclear reactors.

Another object is to provide such power control and flux shaping on a back-fittable basis to presently existing plants.

SUMMARY OF THE INVENTION

The above objects as well as others are achieved by the present invention which comprises a method and apparatus for controlling the operation of full length absorber control rods in a nuclear reactor to achieve improved core power level control and power (flux) distribution control.

Instead of the standard bank of eight control rods, independent groups of four control rods each are used to control the reactor. Each group of rods is controlled independent of any other group with axial spacing between groups varying between 0 and 100% of travel.

A rod control strategy computer processes input information and generates commands which ultimately move the individual groups of control rods. The strategy computer comprises five microprocessor based computation centers. The output from the strategy computer is transmitted to a rod control logic system which converts the move commands into electrical current pulses in the coils of the appropriate control rod drive mechanisms thereby moving the particular group of control rods selected to be moved by the rod control strategy computer.

The five computation centers comprise: a rod motion strategy processor receives input for reactivity changes from the nuclear steam supply system and translates this input into motion commands in conjunction with selecting that combination of rod groups which will minimize power distribution peaking factor; a power distribution calculator continuously determines local power density throughout the reactor core; a rod group worth calculator determines the instantaneous differential and integral reactivity worth of each rod group; a burnup distribution control processor maintains a history of the fuel assembly locations containing control rods relative to their neighbors in order to accomplish uniform fuel burnup throughout the reactor core; and, a partial trip processor which utilizes information from the power distribution calculator to respond to requests for immediate power reductions achieving a partial trip capability.

The five computation centers are interconnected by a shared memory bus structure which is controlled by a communications processor. In addition to moving data from one computation center to another, this processor handles the transmission of information to an operating personnel display system and receives control input from the operating personnel.

The control rod logic system comprises a central processor and the control rod control cabinets which together move the appropriate group of groups of control rods the desired amount. Input to the control rod logic system may comprise a fixed predetermined program with an override control comprising the output from the rod control strategy computer.

A unique arrangement for the control rod control cabinets is also provided by the present invention. The power circuitry comprising the movable gripper coil circuitry and the lift coil circuitry are included in one cabinet. These circuits are used or shared by all the control rod groups. On the other hand, the circuitry for the stationary gripper coil and the switch circuitry for each group of control rods are included within single cabinets, i.e., one cabinet for one control rod group. Thus, each of the single cabinets for the control rod groups, use or share the same power circuitry.

Various other objects, advantages and features of the invention will become apparent to those skilled in the art from the following discussion taken in conjunction with the following drawings, in which:

DESCRIPTION OF THE PREFERRED EMBODIMENTS

Figure 1:
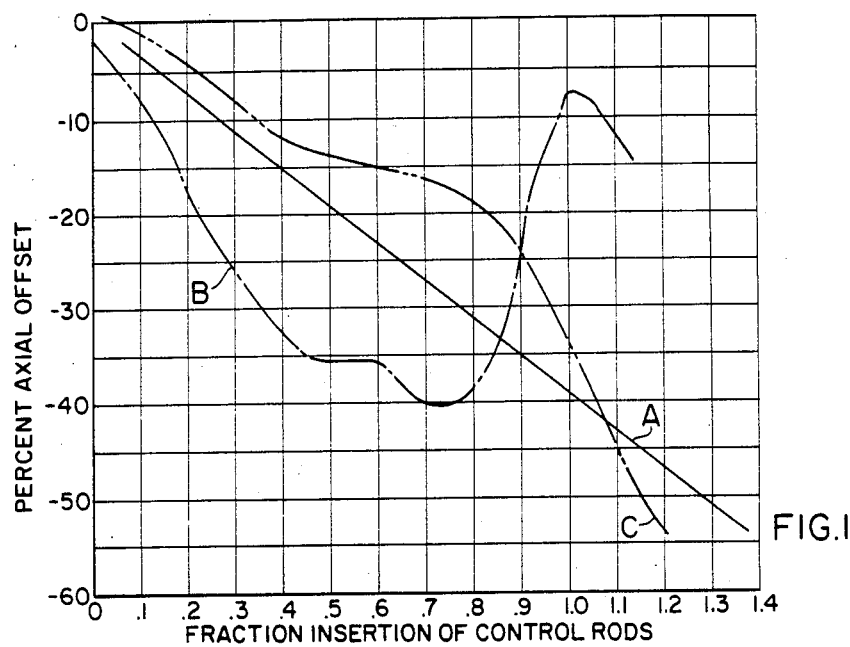
FIG. 1 graphically illustrates the axial flux distribution in the core versus control rod insertion for the present invention as compared to the ideal behavior and the prior art system.
Figure 2:
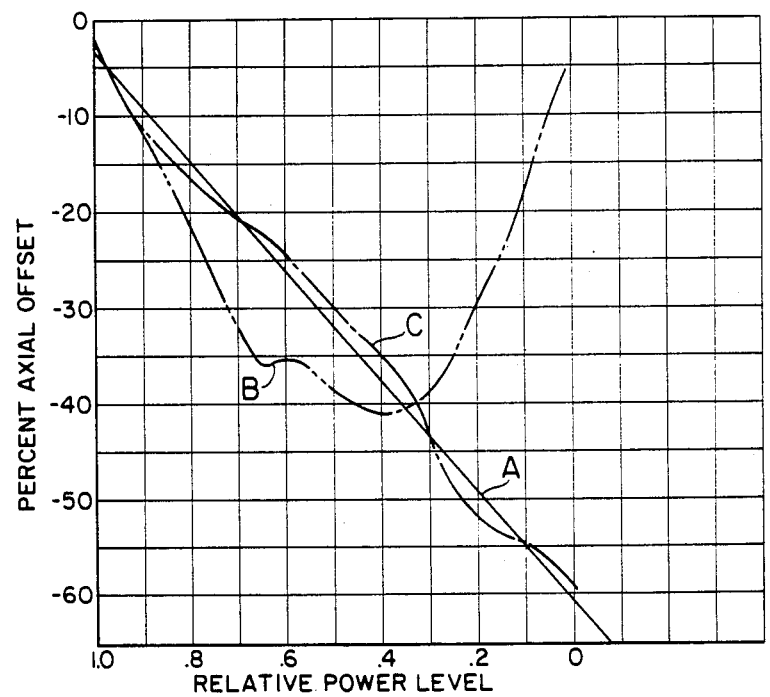
FIG. 2 graphically illustrates the comparison of the systems of FIG. 1, with relative power level substituted for the control rod insertion.

Referring now to the drawings, particularly FIGS. 1 and 2, which graphically show the ideal behavior achieved by the present invention as well as the behavior of the prior art control rod system. In FIG. 1, the percent axial offset is illustrated as a function of control rod insertion in a reactor core. Axial offset is defined as the relative power in the top half of the core minus the relative power in the bottom half of the core divided by the total relative core power. Thus, FIG. 1 shows a comparison of axial offset response for the prior art control rod system and a response for one possible sequence of groups of the present invention.

Figure 3:
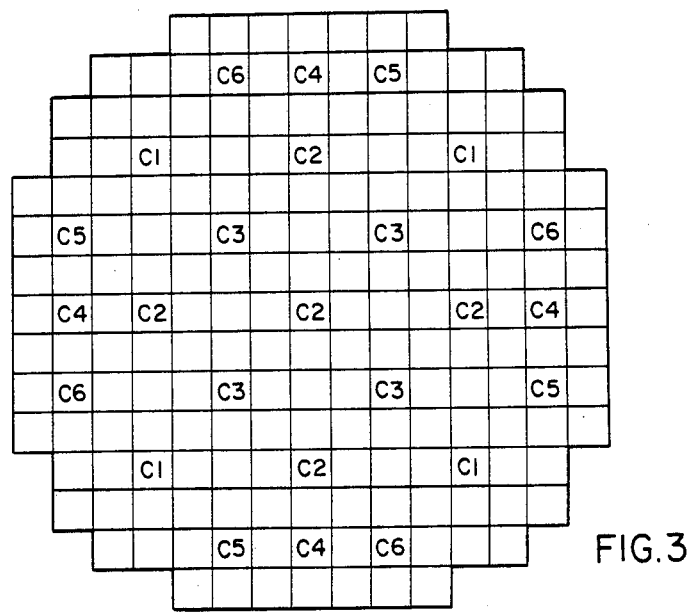
FIG. 3 schematically illustrates one arrangement of the location of control rod groups, each comprising four control rods, in a typical reactor core cross section.

In the ideal situation, axial flux distribution within the core (or percent axial offset) would vary monotonically and linearly with power level for any given core conditions. Therefore, in FIG. 1, the ideal control behavior shown as curve A is a straight line. Curve B shows the response of the insertion sequence of the prior art control system with a fixed overlap between the banks of control rods having eight control rods per bank as described in the Description of the Prior Art, above. In comparing curves A and B, it can readily be observed that there exists a large deviation between the actual response and the ideal response. Curve C depicts the response of a control rod system having four rods per group and as arranged in a reactor core as shown in FIG. 3. Curve C is the response of the insertion of the first bank or group of control rods with the other banks or groups in an overlapped relationship. Thus, curve C shows the response of the inventive control rod system with the spacing or overlap between groups varying between 0 and 100% of travel. The improvement and the near linear response is obvious. Sufficient work has been done to suggest that even better responses are possible.

In FIG. 2, the independent parameter of control rod insertion has been interchanged or replaced by core power level. The ideal behavior or response is again shown by curve A. Curve B shows the response of the prior art grouping of eight control rods per bank with a fixed overlap insertion sequence. The departure from the ideal response is again apparent. Curve C shows the response of the inventive control rod grouping and control system. Its close approximation to the ideal behavior and the improvement over the prior art are also apparent.

FIGS. 1 and 2 thus show that in accordance with the inventive system, full length control rods can be used to effectively control the flux distribution and power level within a reactor core.

FIG. 3 schematically shows the core locations of control groups each containing four control rods in a reactor core having one hundred and ninety-three fuel assemblies. As can be seen, each of the rods within a group of four are symmetrically located within the core cross section. The "C" followed by a number indicates a control rod and its insertion sequence. Thus, the four control rods designated "C1" are the first group of rods to be inserted into the reactor core. Each group of rods is independently controlled relative to any other group and spacing between groups can vary between 0 to 100% of travel.

The prior art control rod bank makeup and the fixed overlap between banks causes undesirable flux peaking factors as a result of control rod insertion or removal, this, in turn, constrains the fuel loading patterns of fuel reload cycles. Also, the prior art arrangement allows a considerable variation in bank worth when an unusual fuel management scheme is necessitated by a utilities' energy requirements. The ability to redefine groups of control rods and their insertion sequence as provided by the present invention provides the following advantages: constant reactivity worth for control functions (integral rod capability, i.e., a proper choice of control rod groups and overlap are made available); flexibility in the control of flux peaking; flexibility in ejected rod severity under hot full power operation (i.e., a choice of controlling groups is made available); and, control of core radial and axial burnup shadowing is achieved (by changing the controlling groups of rods during the fuel cycle).

Figure 4:
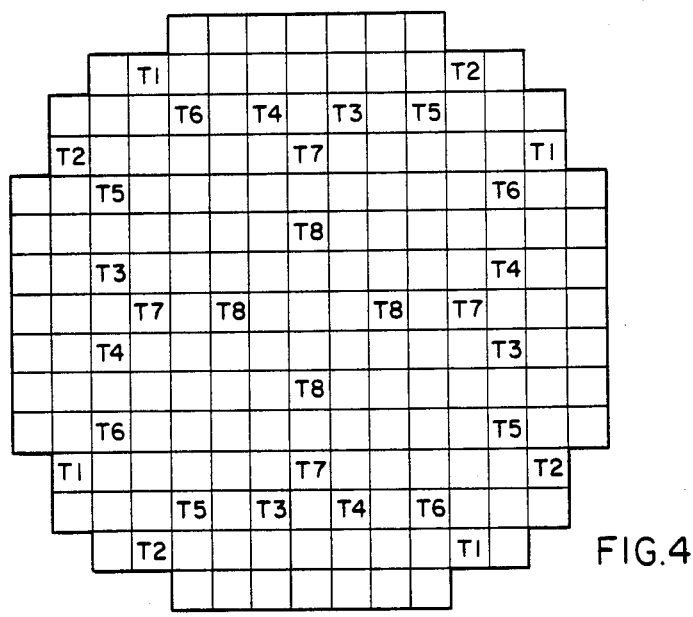
FIG. 4 schematically illustrates one arrangement of the location of control rod partial trip groups in a typical reactor core cross section.

The ability to control each group of control rods individually implies also the capability to trip each group individually. A study was done using only those groups of control rods typically assigned to shutdown banks of control rods in order to evaluate the range of partial trip capability as a result of flexibility provided by the present invention. FIG. 4 shows these trip group locations in the core cross section of FIG. 3. Table 1 shows the reactivity worth of each group of trip control rods at the beginning of life (BOL) and at the end of life (EOL) of an equilibrium fuel cycle. Table 1 indicates the possible interchange of shutdown rods for control rods as suggested in the above-stated advantages of the present invention. Table 2 shows the power levels achievable when selected groups of rods are tripped into the core starting at full power with all the rods out of the core.

TABLE 1

REACTIVITY WORTH OF TRIP GROUPS IN AN EQUILIBRIUM CYCLE

| GROUP | REACTIVITY WORTH % ΔK | |
|---|---|---|
| | BOL | EOL |
| T1 | .298 | .336 |
| T2 | .297 | .336 |
| T3 | .459 | .502 |
| T4 | .459 | .502 |
| T5 | .498 | .545 |
| T6 | .498 | .545 |
| T7 | .591 | .602 |
| T8 | .381 | .445 |

TABLE 2

POWER LEVELS REACHED FROM FULL POWER BY THE INSERTION OF TRIP GROUPS

| TRIP GROUPS INSERTED | POWER LEVEL REACHED | |
|---|---|---|
| | BOL | EOL |
| T1 | .868 | .862 |
| T8 | .833 | .818 |
| T3 | .803 | .792 |
| T7 | .751 | .751 |
| T2 + T8 | .699 | .666 |
| T3 + T8 | .646 | .605 |
| T5 + T6 | .596 | .555 |
| T6 + T7 | .549 | .509 |
| T6 + T7 + T8 | .428 | .339 |
| T2 + T3 + T7 + T8 | .378 | .262 |
| T2 + T3 + T4 + T5 + T6 | .284 | .152 |
| T1 + T2 + T4 + T5 + T6 + T7 | .210 | .050 |

As can be seen by reference to Table 2, a continuum of partial trip power levels may be realized by the proper choice of groups. If the groups of rods typically assigned to the control banks were included in the evaluation of partial trip capability, the range could be extended even further and/or smaller increments between power levels may be achieved.

Figure 5:
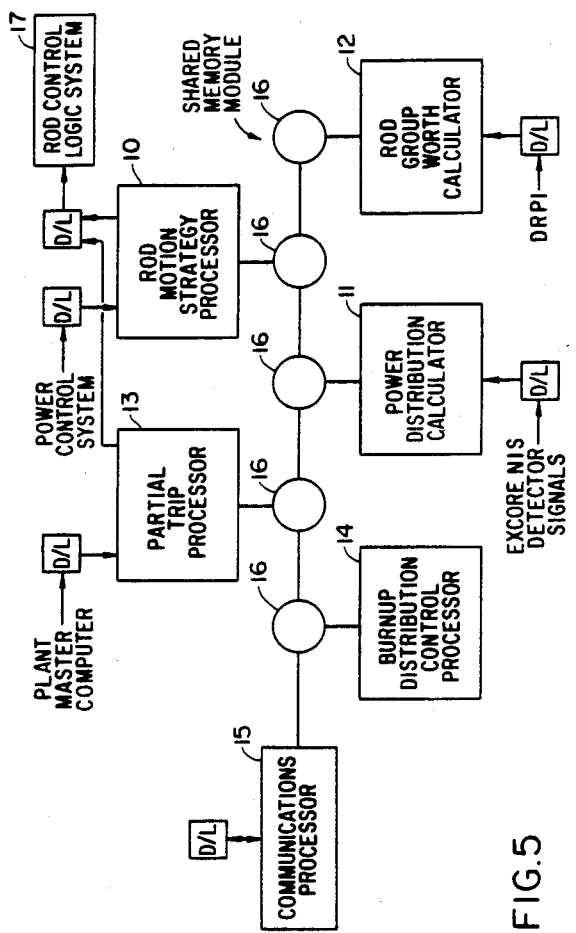
FIG. 5 schematically illustrates an operational arrangement of a rod control strategy computer as provided by the present invention.

The commands to move the individual groups of control and/or trip rods are generated by a rod control system comprising a rod control strategy computer. The output of the control computer is transmitted to the rod control logic system which converts the move commands into current pulses in the appropriate control rod drive mechanism coils. The rod control strategy computer is schematically shown in FIG. 5 and is made up of several microprocessor based computers.

The rod motion strategy processor 10 receives input for reactivity changes from the nuclear steam supply system and generates the necessary motion commands to move the individual control rod groups. The rod motion strategy processor selects from the various combinations of groups of control rods, that combination which will minimize the power distribution peaking factor subject to the following constraints: the total control rod worth available for immediate insertion, comprising the shutdown margin, is kept above a given limit which limit varies as a function of the operating power level; the core axial power distribution is maintained within prescribed limitations to prevent problems associated with xenon redistributions; each combination of rod groups is assigned a predetermined insertion and withdrawal speed limitation which is dependent upon the distribution of the groups in the rod control system power cabinets. The unlimited flexibility provided by these constraints allows for optimal fuel economics which, of course, is very advantageous considering the present day fuel costs. A somewhat less flexible approach or a strategy which is more restrictive is the use of two or more preselected groups of control rods to adjust for required reactivity changes. The preselected groups may be changed at predetermined times compensate for the use of this restrictive strategy in minimizing the power distribution peaking factors. There are other strategies which may also be used which includes the use of plant operating personnel. For example, the rod motion strategy processor could analyze the data input and recommend the various combinations of rods to achieve optimum control of the reactor which recommendation would be effectuated manually by the plant operating personnel.

The power distribution calculator 11 continuously determines local power density throughout the reactor core. The reactor core is divided into a large number of coupled reactor regions bounded by core axial and radial coordinates. For example, the horizontal across the flats dimensions of the fuel assemblies may comprise the radial coordinates of a region while the axial coordinates may comprise the planes fixed by the multisection excore NIS detectors. The local power density of each region is determined from point kinetic calculations based on the effective level of reactivity for that cell, the neutron leakage from and to adjacent regions, and the amount of neutron absorber existing within that region. The neutron absorber includes such items as the presence of a control rod, the presence of a burnable poison in the reactor coolant, the amount of xenon buildup in the fuel assembly, as well as any other like poisons or neutron absorbers in that region. The effective level of reactivity is calibrated on a predetermined time schedule, for example, weekly, biweekly, etc., to achieve agreement with the incore flux maps which are commonly being generated. Also, the average region power on each reactor plane is normalized to the measured power level for that plane as obtained by the excore NIS detectors. From these calculations, the total core power distribution, and power peaking factors are obtained as well as the predicted peaking factor changes for motion of each control rod group.

The calculated power distribution from the power distribution calculator and the then current control rod positions, as measured by the digital rod position indication system, (DRPI) are used by the rod group worth calculator 12 to determine the instantaneous differential and integral reactivity worth of each control rod group.

The worths as calculated by the group worth calculator 12 are used by the rod motion strategy processor 10 as input in its determination of the optimal motion commands for the individual control rod groups.

The rod group integral reactivity worths as determined by the rod group worth calculator 12 are used by a partial trip processor 13 to respond to requests for immediate power reductions. The partial trip processor 13 selects the appropriate rod groups (either the trip rods or a combination of trip rods and control rods) and transmits commands to drop those rods into the core by deenergizing their respective control rod drive mechanisms. This partial trip capability improves the overall plant availability by keeping the plant on line following certain large component malfunctions, such as loss of a feedwater pump or a reactor coolant pump. The partial trip capability also has the potential for significantly reducing the capacity requirements of a steam dump system, i.e., condenser size.

A burnup distribution control processor 14 maintains a history of the power distribution of the rodded fuel assemblies relative to the adjacent fuel assemblies and generates commands to remove the rods from any of the fuel assemblies which have been operating at relatively lower power levels.

The rod motion strategy processor 10 replaces the removed rods with other different rods to maintain total core balance. Thus, over the long term, core burnup will be evenly distributed. Additionally, processor 14 reduces the potential for pellet clad interaction (PCI) failures due to rapid power increases by keeping the entire core at a uniformly high "precondition" power.

The five modules making up the rod control strategy computer are interconnected by a shared memory bus arrangement 16 which may be controlled by a communications processor 15. In addition to moving data from one module to another, the communications processor 15 receives operator control inputs and transmits information from the five modules to the operator display system.

Figure 6:
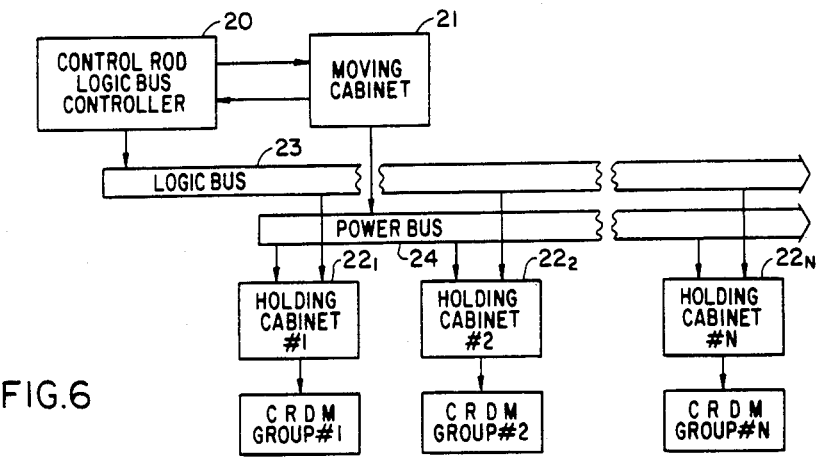
FIG. 6 schematically illustrates a bus organized power cabinet system for controlling the movement of individual groups of control rods as controlled by a central processor; and, FIG. 7 schematically illustrates, in another manner, the embodiment of FIG. 6.

The partial trip processor 13 and the rod motion strategy processor 10 output command signals to move the appropriate control rods in an appropriate amount. The output signals are received by a rod control logic system 17. The logic system 17 causes the intended control rod drive mechanism lift, movable gripper and stationary gripper coils to activate, in the proper manner, and to actually move the intended group of four control rods. FIG. 6 schematically shows the bus arrangement whereby power to the rod control apparatus arranged on a data or logic bus, is itself controlled and bus arranged for distribution to the rod control apparatus. The logic bus controller 20 comprises part of the control rod logic system 17 and receives input from the rod motion strategy processor 10 and the partial trip processor 13. Moving cabinet 21 contains the power circuitry for the lift coils and the movable gripper coils for all of the control rods in the core. The holding cabinets 22, $22_2$... $22_n$ contain the power circuitry for the holding apparatus (stationary gripper coils) for the respective group of four control rods controlled by that particular power cabinet. Logic bus 23 in conjunction with bus controller 20 supplies signals to the individual holding cabinets 22 directing which particular cabinet is to be connected to power bus 24 to move the particular group of control rods selected by, for example, the rod motion strategy processor 10. Simultaneously, the power to the remaining control rod groups is withheld from their respective holding cabinets. It is to be understood that the bus controller 20 can command that the moving cabinet 21 power circuitry be shared among more than one holding cabinet 22 at any particular time so that, if it is desired, more than one group of rods may be simultaneously moved.

Figure 7:
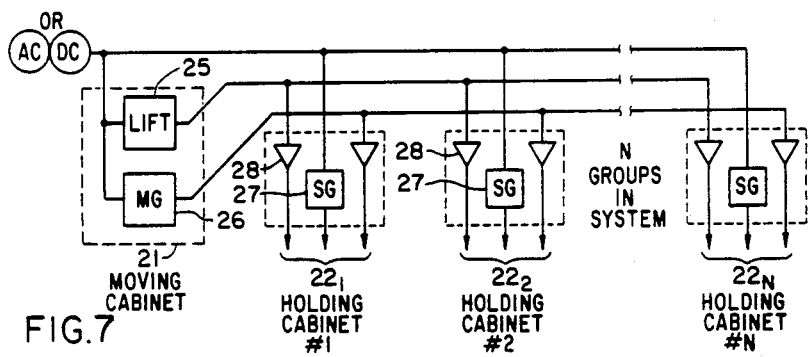

FIG. 7 schematically illustrates the embodiment of FIG. 6 but in another manner. Moving cabinet 21 contains the power circuitry 25 and 26 for the lift coils and the movable gripper coils of the control rods. The lift 25 and the movable gripper 26 circuitry is distributed to the individual holding cabinets 22 by the illustrated bus arrangement. The power circuitry for the stationary gripper coils 27 of the control rods groups is contained within each of the respective holding cabinets 22. The inverted triangles designated by the numeral 28 in each of the holding cabinets schematically designates the selection logic provided by logic bus controller 20 and logic bus 23 of FIG. 6.

In the manner illustrated, the moving circuitry for all the control rods in the core can be contained in a single housing or cabinet 21. In actual practice, the moving circuitry would be redundantly supplied in two cabinets. In this case, one cabinet could serve as a space and automatically replace the primary moving cabinet in event of a malfunction in that cabinet. Alternatively, both cabinets could be normally on line with the rod groups distributed between the two; in this case, malfunction of either cabinet would shift its rod groups to the remaining good moving cabinet. The advantage of the latter arrangement would be to allow ~30% faster reactivity control from the rods, due to detailed consideration of control rod drive mechanism operation.

Similarly, the bussed power arrangement allows for failure of one or more holding cabinets on line without dropping of the associated control rods. This is accomplished through an "insurance" bus bar in the power bus duct. All holding cabinets normally contribute to the insurance bus. When a cabinet malfunctions, it automatically switches its rod group onto the insurance bus, to replace the cabinets normal holding function.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

We claim as our invention:

1. A system for controlling a nuclear reactor comprising a nuclear core comprising a plurality of fissile fuel elements having openings therebetween, a plurality of control rods containing a neutron absorbing material arranged throughout said core and fitting within said openings between said fuel elements, said control rods being movably insertable and withdrawable from said openings by drive means comprising linear motion apparatus having lift, movable gripper and stationary gripper solenoid coils, said control rods being arranged in groups of a predetermined number of control rods which predetermined number move together, means for directing the movement of said groups of control rods to control the core radial power distribution and the core axial power distribution and means for sharing the power circuitry among said control rod groups, said power circuitry being connected to the drive mechanism of each group of control rods, said means for sharing the power circuitry comprising a plurality of storage enclosures, with one enclosure containing the power circuitry for the lift and movable gripper coils for all of said groups of control rods in combination with separate enclosures which contain the power circuitry for the stationary gripper coils for each respective group of control rods.

2. The control system of claim 1, wherein the power circuitry for the lift and movable gripper coils shared by all the groups of control rods is distributed to each of said other enclosures by means of a bus bar arrangement.

3. The control system of claim 1, wherein said means for directing the movement of said control rod groups comprises a control rod movement strategy processor comprising means for receiving signals for reactivity changes from a reactor power control system and converting said signals into motion commands for said rod groups by selecting from the groups of rods which will satisfy the reactivity changes that combination of groups of rods which minimizes power distribution peaking factors.

4. The control system of claim 3, wherein said means for directing the movement of said control rod groups further comprises a partial trip processor comprising means for receiving signals for immediate power reductions from said reactor power control system and converting said signals into commands to drop selected rod groups into said core by deenergizing the drive mechanisms of said control rod groups, said partial trip processor and said rod motion strategy processor being functionally connected by means for exchanging and acting upon each other's receiving and command signals.

5. The control system of claim 4, wherein said means for directing the movement of said control rod groups further comprises a power distribution calculator comprising means for determining local power density at a number of local regions throughout the core by considering at each region the effective reactivity the neutron leakage to and from adjacent regions and the amount of absorber material in each region, said power distribution calculator being functionally connected to said partial trip processor and said rod motion strategy processor.

6. The control system of claim 5, wherein said means for directing the movement of said control rod groups further comprises a rod group worth calculator comprising means to determine the instantaneous differential and integral reactivity worth of each control rod group by using the calculated power distribution and the then current control rod positions, said rod group worth calculator being functionally connected to said partial trip processor, said rod motion strategy processor and said power distribution calculator.

7. The control system of claim 6, wherein said means for directing the movement of said control rod groups further comprises a fuel burnup distribution control processor comprising means for maintaining uniform core burnup by maintaining a history of the power distribution of fuel elements with control rods relative to the neighboring elements and generates commands to remove control rods from elements which have been at a lower power level for a relatively extended period of time, said fuel burnup distribution control processor being functionally connected to said partial trip processor, said rod motion strategy processor, said power distribution calculator and said rod group worth calculator.

8. The control system of claim 7, wherein said means for directing the movement of said control rod groups further comprises a communications processor comprising means for functionally connecting said partial trip processor, said rod/motion strategy processor, said burnup distribution control processor, said power distribution calculator, and said rod group worth calculator by a shared memory bus arrangement moving data from one module to another.

9. A system for controlling a nuclear reactor comprising a nuclear core comprising a plurality of fissile fuel elements having openings therebetween, a plurality of control rods containing a neutron absorbing material arranged throughout said core and fitting within said openings between said fuel elements, said control rods being movably insertable and withdrawable from said openings, said control rods being arranged in groups of a predetermined number of control rods which predetermined number move together, means for directing the movement of said groups of control rods to control the core radial power distribution and the core axial power distribution, and means for sharing the power circuitry among said control rod groups comprising a plurality of storage enclosures with one enclosure containing the power circuitry for the lift and movable gripper coils for all of said groups of control rods in combination with separate enclosures which contain the power circuitry for the stationary gripper coils for each respective group of control rods, said power circuitry being connected to the drive mechanism of each group of control rods, said means for directing the movement of said control rod groups comprising:

a control rod movement strategy processor comprising means for receiving signals for reactivity changes from a reactor power control system and converting said signals into motion commands for said rod groups by selecting from the groups of rods which will satisfy the reactivity changes that combination of groups of rods which minimizes power distribution peaking factors, a partial trip processor comprising means for receiving signals for immediate power reductions from said reactor power control system and converting said signals into commands to drop selected rod groups into said core by de-energizing the drive mechanisms of said control rod groups, a power distribution calculator comprising means for determining local power density at a number of local regions throughout the core by considering at each region: the effective reactivity, the neutron leakage to and from adjacent regions, and the amount of absorber material in each region, a rod group worth calculator comprising means to determine the instantaneous differential and integral reactivity worth of each control rod group by using the calculated power distribution and the then current control rod positions, a fuel burnup distribution control processor comprising means for maintaining uniform core burnup by maintaining a history of the power distribution of fuel elements with control rods relative to the neighboring elements and generates commands to remove control rods from elements which have been at a lower power level for a relatively extended period of time, and a communications procesor comprising means for functionally connecting said partial trip processor, said rod motion strategy processor, said burnup distribution control processor, said power distribution calculator, and said rod group worth calculator by a shared memory bus arrangement moving data from one module to another.

* * * * *